United States Patent
Fournier

[15] 3,670,898
[45] June 20, 1972

[54] FILTER HAVING A FLEXIBLE WALL FOR FILTERING LIQUIDS

[72] Inventor: Eugene Fournier, 84 Chateauneuf De Gadagne, France

[22] Filed: June 17, 1970

[21] Appl. No.: 47,100

[30] Foreign Application Priority Data

June 20, 1969 France....................6920776

[52] U.S. Cl..........................210/356, 210/484, 210/489
[51] Int. Cl. ..........................................C03b 3/00
[58] Field of Search..............210/440, 356, 483, 137, 484, 210/489

[56] References Cited

UNITED STATES PATENTS 2,460,084  1/1949  Hebo.....................................210/356
3,334,748  8/1967  Bozek...................................210/137 X
3,563,388  2/1971  Briggs...................................210/484 X

*Primary Examiner*—S. Leon Bashore
*Assistant Examiner*—Robert L. Lindsay, Jr.
*Attorney*—Robert E. Burns and Emmanuel J. Lobato

[57] ABSTRACT

An apparatus for filtering a fluid medium, for example, dirty swimming pool water, comprises a hollow filter sleeve having a flexible wall which wall is caused to deform by the pressure of fluid medium flowing through the wall. The end of the sleeve is attached to a member which on reduction of the pressure of the fluid flowing through the wall causes the wall to straighten and assume its original position thereby causing debris resting on the wall to be moved from the wall.

6 Claims, 1 Drawing Figure

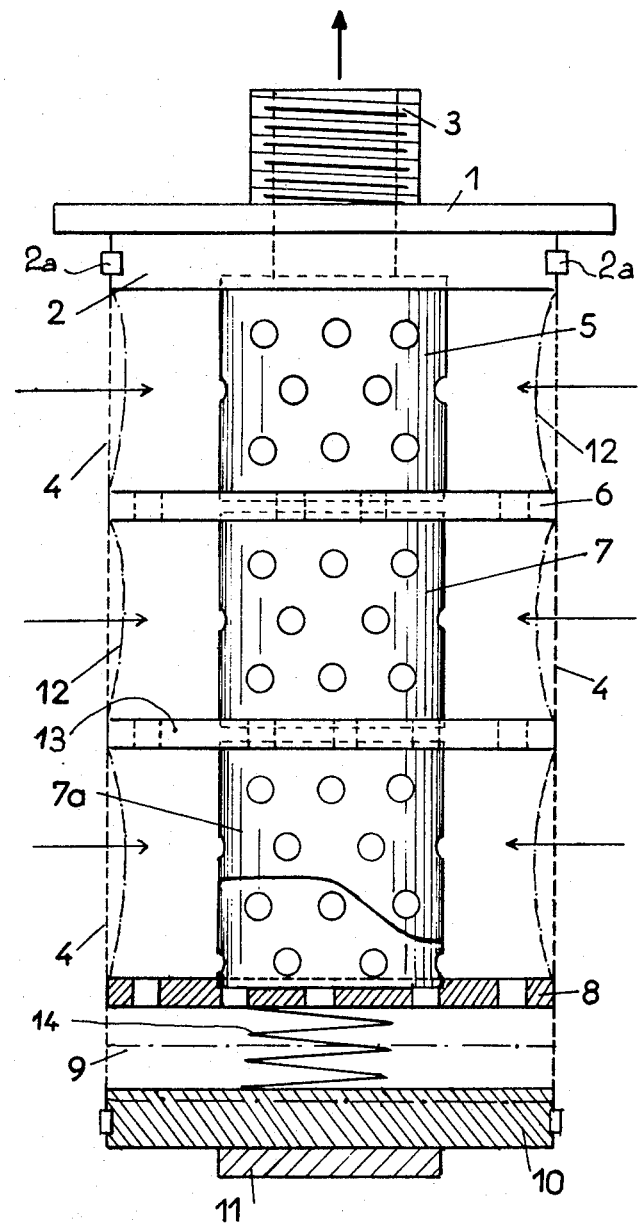

FILTER HAVING A FLEXIBLE WALL FOR FILTERING LIQUIDS

BACKGROUND OF THE INVENTION

This invention relates to apparatus for filtering fluid media, and in particular to apparatus for filtering liquids such as dirty water from swimming pools.

Apparatus is known for filtering liquids which, after a period of time, becomes inoperative because it has become clogged with filtered debris. It can be both inconvenient and uneconomic to remove the apparatus to remove the debris.

AIMS OF THE INVENTION

One object of the present invention is to provide apparatus for filtering fluid media which can be cleared of filtered debris in situ. A further object is to provide an apparatus for filtering fluid media which is simple to construct and install.

According to the present invention an apparatus for filtering a fluid medium comprises a hollow filter sleeve having a flexible wall and a member attached at one end to the wall of the sleeve for closing the end of the sleeve, flexure of the wall by the pressure of fluid medium flowing through the wall causing the member to move in one sense, and a reduction in pressure of the fluid medium to a predetermined level permitting the member to move in a different sense to return the wall to its original shape before flexure.

Preferably, the opposite end of the filter sleeve depends from an end piece having a through aperture for the discharge of filtered fluid medium In a preferred embodiment, a tubular member is arranged within the filter sleeve and depends from the end piece, the tubular member having a plurality of through apertures in its wall for permitting the flow of filtered fluid medium from the exterior of the tubular member, through the interior of the tubular member and through the aperture in the end piece.

A perforated disc may be attached to and surround the tubular member, the wall of the sleeve bearing against the peripheral edge of the disc, or a plurality of such perforated discs may be attached at spaced apart positions surrounding the tubular member, the wall of the sleeve bearing against the peripheral edge of each disc.

Preferably, resilient means is provided between one disc and the member for biasing the member against the movement caused by flexure of the wall.

DESCRIPTION OF DRAWING

An embodiment of the invention will now be described, by way of example, reference being made to the FIGURE of the accompanying drawing which is a schematic, partly sectional view through an apparatus for filtering fluid media.

DESCRIPTION OF A PREFERRED EMBODIMENT

As shown, a hollow filter sleeve 4 having a flexible wall of a material such as a synthetic or metalic fabric, depends from an end piece 2 to which it is attached at its upper end by clamping means 2a. The end piece 2 has a through aperture 3 for the discharge of filtered media. At its bottom end, the filter sleeve is attached to a member 10 to which is fixed ballast 11. The member 10 closes the bottom end of the filter sleeve 4.

A tubular part 5 depends from the end piece 2 within the filter sleeve 4 and is attached at its bottom end to a perforated disc 6 which surrounds the tubular part. Further tubular parts 7, 7a substantially identical to the tubular part are arranged co-axially with the tubular part 5 and are attached at their ends to perforated discs 6, 13 and 8 respectively. The discs 6, 13, 8 are of such a size that the wall of the filter sleeve 4 bears against their peripheral edges. The walls of the tubular parts 5, 7, 7a are each provided with a plurality of through apertures and form collectively a tubular member.

A spring 14 is positioned in a space 9 between the lower most disc 8 and the member 10.

In operation, the apparatus is attached by the end piece 2 to a support member 1 of a container (not shown) arranged in the fluid, for example, dirty swimming pool water, to be filtered. The dirty water is pumped as shown by the arrows, from the outside of filter sleeve 4, through the wall of the filter sleeve 4 then through the apertures in the tubular parts 5, 7, 7a to discharge at the aperture 3 in the end piece 2. The wall of the filter speeve 4 permits the passage therethrough of the water but prevents any impurities and debris from passing therethrough. This debris tends to cling to the outside surface of the wall of the filter sleeve 4 which due to its flexibility and to the pressure of the water, is caused to deform to take up a generally concave curved shape between adjacent discs 6, 13, 8 and end piece 2 as indicated by reference numeral 12. The flexure of the wall inwardly causes the member 10 and ballast 11 to rise, thereby compressing the spring 14.

When the wall of the filter sleeve 4 is required to be cleaned, the pressure of the water is dropped to a predetermined level which permits the spring 14 and ballast 11 to move the member 10 downwards to straighten the wall of the filter sleeve 4. This straightening action causes the debris on the wall to fall to the bottom of the container from where it can be removed.

Modifications can be made to the above described embodiment. For example, the tubular member can be in one piece or there can be more or less than the three tubular parts 5, 7, 7a. The spring 14 need not be provided and the member 10 can be moved under gravity only, by virtue of its own weight and ballast 11. More or less than three spaced perforated discs can be provided. The attachment of the discs 6, 13, 8 to the tubular parts can be by pins, welding or any known means.

What is claimed is:

1. Apparatus for filtering a fluid comprising a first end disc member having a fluid outlet aperture and means for connecting said first end disc member to a support and connecting said outlet aperture to suction means, a second end disc member which is imperforate and is coaxial with and axially movable relative to said first end disc member, a flexible filter sleeve extending between said first end disc member and said second end disc member and having one end secured to the periphery of said first end disc member and the opposite end secured to the periphery of said second end disc member, and gravity actuated ballast means biasing said second end disc member axially away from said first end disc member to tension said flexible filter sleeve to approximately cylindrical form when no suction is applied to said outlet, portions of said sleeve between said end disc members flexing inwardly when said apparatus is immersed in a fluid containing solids and suction is applied to said outlet to form at least one annular recess receiving solids deposited on said filter sleeve, said filter sleeve being restored to its approximately cylindrical form by said biasing means to discharge said solids upon cessation of said suction.

2. Apparatus according to claim 1, further comprising at least one perforate intermediate disc disposed coaxially between said end disc members and peripherally engaging and supporting said filter sleeve intermediate said end disc members, and supporting means connecting said intermediate disc with said first end disc member to support it in fixed relation to said first end disc member.

3. Apparatus according to claim 2, in which said supporting means comprises a coaxial perforate tube communicating with said outlet aperture.

4. Apparatus according to claim 3, in which a plurality of said intermediate discs are spaced from one another and supported by sections of said perforate tube.

5. Apparatus for filtering a fluid comprising a first end disc member having a central fluid outlet aperture and means for connecting said first end disc member to a support and connecting said outlet aperture to suction means, a second end disc member which is imperforate and is coaxial with and axially movable relative to said first end disc member, a flexible filter sleeve extending between said first end disc member and said second end disc member and having one end secured to the periphery of said first end disc member and the opposite end secured to the periphery of said second end disc member, central perforate tube means fixed to said first end disc member and extending toward said second end disc member and communicating with said outlet aperture, a plurality of coaxial intermediate discs fixed on said tube means between said end disc members in axially spaced relation relative to said end disc members and to one another, said discs peripherally engaging and supporting said flexible filter sleeve, and gravity actuated ballast means biasing said second end disc member axially away from said first end disc member to tension said flexible filter sleeve to approximately cylindrical form when no suction is applied to said outlet, portions of said sleeve between said end disc members and said intermediate discs flexing inwardly when said apparatus is immersed in a fluid containing solids and suction is applied to said outlet to form annular recesses receiving solids deposited on said filter sleeve, said filter sleeve being restored to its approximately cylindrical form by said biasing means to disengage said solids upon cessation of said suction.

6. Apparatus according to claim 5, in which said intermediate discs are perforate.

* * * * *